United States Patent
Vajravel et al.

(10) Patent No.: US 12,399,980 B2
(45) Date of Patent: Aug. 26, 2025

(54) PROVIDING EXPERIENCE MANAGEMENT FOR CONTAINERIZED APPLICATIONS ACROSS MIGRATIONS

(71) Applicant: Dell Products L.P., Round Rock, TX (US)

(72) Inventors: Gokul Thiruchengode Vajravel, Bangalore (IN); Jyothi Bandakka, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 18/047,967

(22) Filed: Oct. 19, 2022

(65) Prior Publication Data

US 2024/0134963 A1 Apr. 25, 2024
US 2024/0232330 A9 Jul. 11, 2024

(51) Int. Cl.
G06F 21/53 (2013.01)

(52) U.S. Cl.
CPC ........ *G06F 21/53* (2013.01); *G06F 2221/034* (2013.01)

(58) Field of Classification Search
CPC ...... G06F 21/53; G06F 9/4856; G06F 9/4875; G06F 9/5088
See application file for complete search history.

(56) References Cited

U.S. PATENT DOCUMENTS

| | | | |
|---|---|---|---|
| 2015/0254103 A1* | 9/2015 | Chandrasekaran | G06F 9/4856 718/1 |
| 2018/0341520 A1* | 11/2018 | Zhu | H04L 41/50 |
| 2019/0347127 A1* | 11/2019 | Coady | G06F 8/63 |
| 2022/0308915 A1* | 9/2022 | Iyer | G06F 21/577 |
| 2023/0009930 A1* | 1/2023 | Wang | G06F 9/4856 |

* cited by examiner

*Primary Examiner* — Daniel B Potratz
(74) *Attorney, Agent, or Firm* — Kirton McConkie; Brian Tucker

(57) ABSTRACT

When a containerized application for which experience management services are being performed is to be migrated to a new secure workspace on a user computing device, a workspace orchestrator can interface with a migration agent on the user computing device to cause the migration agent to perform the migration. The workspace agent can also interface with a host agent on the user computing device to provide information about the new secure workspace to which the containerized application is being migrated. When the migration is performed, the host agent can notify an experience management agent on the user computing device and provide the information about the new workspace. The experience management agent can then use the information about the new secure workspace to apply policies or configurations to the new secure workspace to thereby cause the same experience management services to be provided to the containerized application in the new secure workspace.

20 Claims, 12 Drawing Sheets

PROVIDING EXPERIENCE MANAGEMENT FOR CONTAINERIZED APPLICATIONS ACROSS MIGRATIONS

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine, a software-based container, or a browser. An application hosted in a secure workspace, which can be considered a "containerized application," will be isolated from resources in the external environment and from other applications or services hosted external to the secure workspace, including native applications.

Experience management solutions can be used to enhance an end user's experience when using containerized applications. For example, an experience management solution may perform telemetry, remediation, or recommendation services for a containerized application (or "experience management services").

Typically, an experience management solution will leverage an experience management agent that executes on the user computing device to apply policies and configurations to a secure workspace to provide experience management services for an application hosted in the secure workspace. In some cases, a containerized application may be migrated from one secure workspace to another. If experience management services are provided to the containerized application, the migration of the containerized application to a new secure workspace will break such services. In particular, the policies or configurations for performing the experience management services are applied at the secure workspace level and therefore do not follow the containerized application in a migration. Additionally, the experience management agent will have no way of knowing to which secure workspace the containerized application has been migrated.

BRIEF SUMMARY

The present invention extends to systems, methods and computer program products for providing experience management for containerized applications across migrations. When a containerized application for which experience management services are being performed is to be migrated to a new secure workspace on a user computing device, a workspace orchestrator can interface with a migration agent on the user computing device to cause the migration agent to perform the migration. The workspace agent can also interface with a host agent on the user computing device to provide information about the new secure workspace to which the containerized application is being migrated. When the migration is performed, the host agent can notify an experience management agent on the user computing device and provide the information about the new workspace. The experience management agent can then use the information about the new secure workspace to apply policies or configurations to the new secure workspace to thereby cause the same experience management services to be provided to the containerized application in the new secure workspace.

In some embodiments, the present invention may be implemented as a method for providing experience management for containerized applications across migrations. An experience management agent that is executing on a user computing device can receive a first notification that an application hosted in a first secure workspace is to be migrated to a second secure workspace. The first notification can include an identifier of the second secure workspace. An association can be created between the identifier of the second secure workspace and one or more experience management policies or configurations that are currently applied to the first secure workspace. The experience management agent can receive a second notification that the application has been migrated to the second secure workspace. Based on the association between the identifier of the second secure workspace and the one or more experience management policies or configurations, the one or more experience management policies or configurations can be applied to the second secure workspace.

In some embodiments, the present invention may be implemented as computer storage media storing computer executable instructions which when executed implement a method for providing experience management for containerized applications across migrations. A request to migrate an application from a first secure workspace to a second secure workspace on a user computing device can be received. The second secure workspace can be prepared. In conjunction with preparing the second secure workspace, a first notification can be sent to an experience management agent. The first notification can include an identifier of the second secure workspace. An association between the identifier of the second secure workspace and one or more experience management policies or configurations that are currently applied to the first secure workspace can be created. The application can be migrated to the second secure workspace. A second notification can be sent to the experience management agent indicating that the application has been migrated to the second secure workspace. In response to the second notification, the one or more experience management policies or configurations can be applied to the second secure workspace.

In some embodiments, the present invention can be implemented as a system that includes a workspace orchestrator, an experience management solution, and one or more user computing devices. Each user computing device includes a host agent, a migration agent, and an experience management agent. The system can be configured to implement a method for providing experience management for containerized applications across migrations. The experience management agent that is executing on a first user computing device of the one or more user computing devices can receive a first notification that an application hosted in a first secure workspace is to be migrated to a second secure workspace. The first notification can include an identifier of the second secure workspace. An association between the identifier of the second secure workspace and one or more experience management policies or configurations that are currently applied to the first secure workspace can be created. The experience management agent can receive a second notification that the application has been migrated to the second secure workspace. Based on the association between the identifier of the second secure workspace and the one or more experience management policies or configurations, the one or more experience management policies or configurations can be applied to the second secure workspace.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
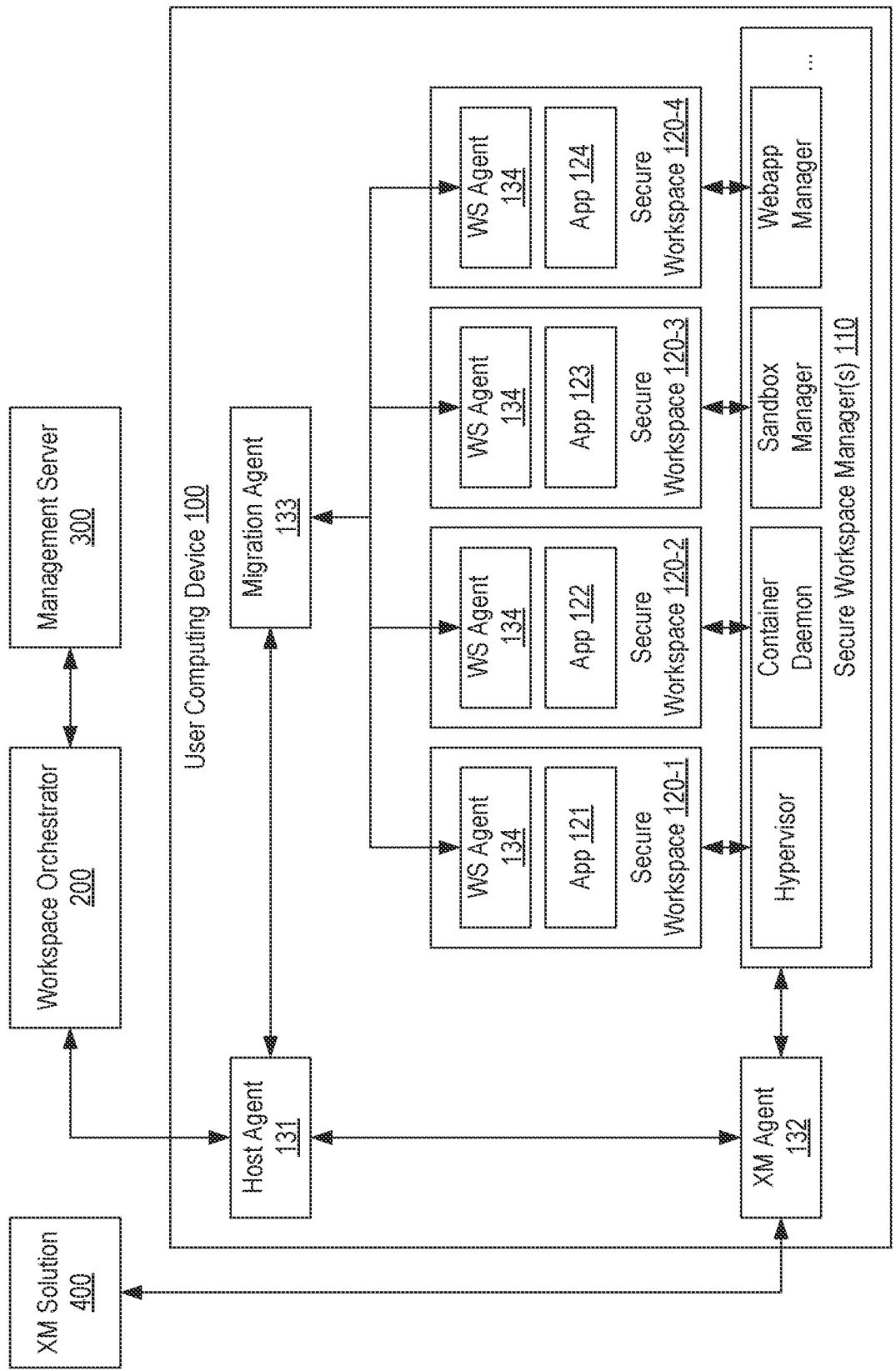
FIG. 1 provides an example of a computing environment in which embodiments of the present invention may be implemented.

FIG. 1 provides an example of a computing environment in which one or more embodiments of the present invention may be implemented. This computing environment includes a user computing device 100, a workspace orchestrator 200 which is used to orchestrate secure workspaces on user computing device 100, a management server 300 which is used to manage user computing device 100, and an experience management solution 400. Although only a single user computing device 100 is shown, workspace orchestrator 200, management server 300, and experience management solution 400 may typically be used to provide their respective services to a large number of user computing devices, any or all of which could be configured in the same manner as user computing device 100 to thereby allow experience management to be provided for containerized applications across migrations in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that four workspaces are deployed on user computing device 100: secure workspace 120-1 in the form of a virtual machine; secure workspace 120-2 in the form of a container; secure workspace 120-3 in the form of a sandbox, and secure workspace 120-4 in the form of a browser. However, there could be any number and/or type of secure workspaces at any given time. These secure workspaces are represented as hosting applications 121, 122, 123, and 124 respectively. Notably, a secure workspace could include more than one application.

User computing device 100 is also shown as having a host agent 131, an experience management agent 132, and a migration agent 133. Host agent 131 can be configured to implement management services on user computing device 100 including, of most relevance to embodiments of the present invention, the deployment and management of secure workspaces on user computing device 100. For example, workspace orchestrator 200 may interface with host agent 131 to provide secure workspaces (or at least information for creating secure workspaces), and host agent 131 may interface with secure workspace manager(s) 110 to create and manage the secure workspaces.

User computing device 100 also includes an experience management agent 132 which can represent that component on user computing device 100 that experience management solution 400 employs to provide experience management services for containerized applications (and possibly other applications). For example, experience management solution 400 can provide policies and/or configurations specific to a containerized application to experience management agent 132 which in turn can apply the policies and/or configurations to the secure workspace hosting the containerized application.

User computing device 100 further includes a migration agent 133 that can be configured to migrate a containerized application from one secure workspace to another. Each secure workspace may include a workspace agent 134 with which migration agent 133 may interface as part of performing a migration.

Figure 2A:
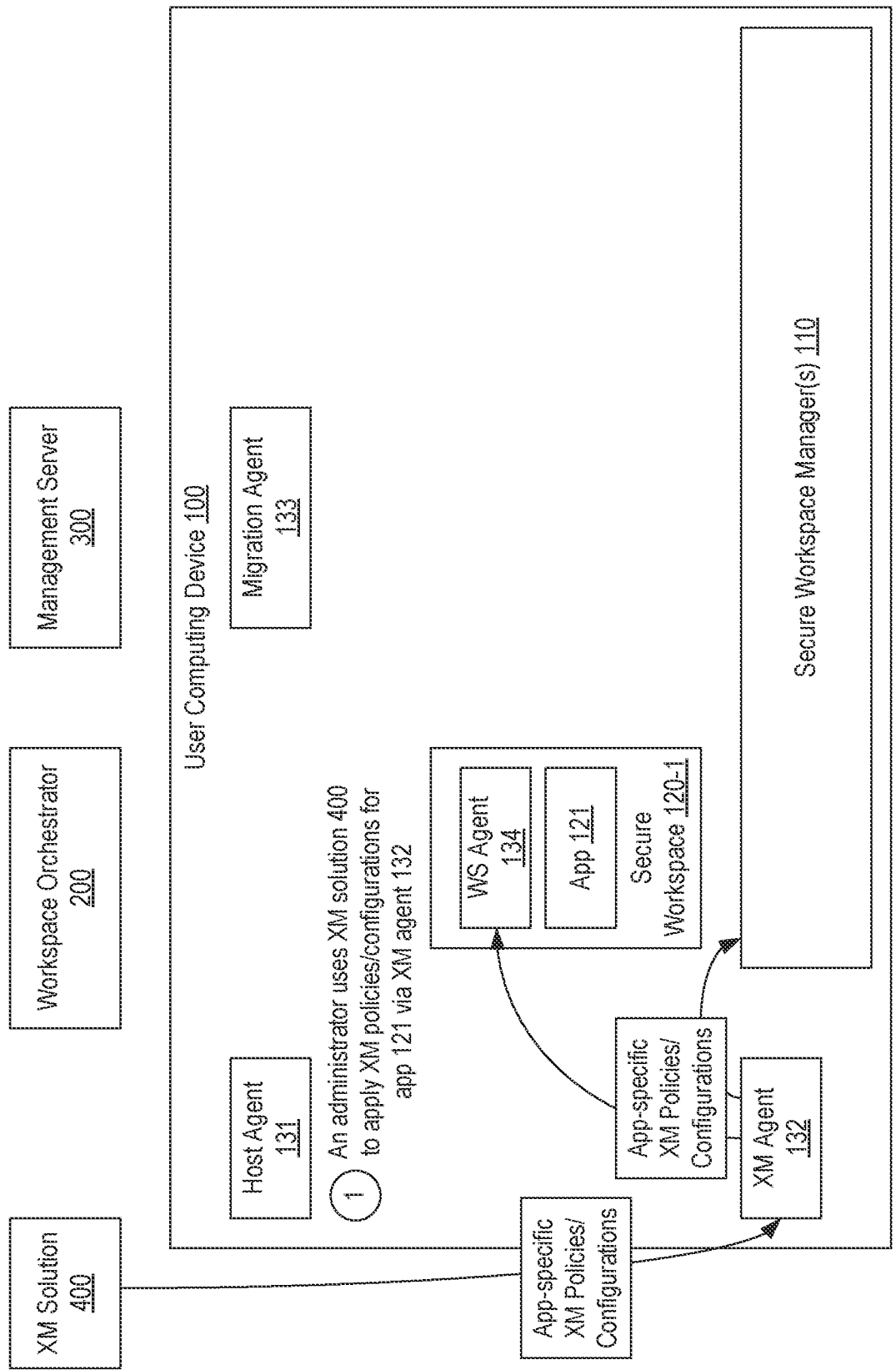
FIGS. 2A-2G provide an example of how experience management can be provided for containerized applications across migrations in accordance with one or more embodiments of the present invention.

FIGS. 2A-2G provide an example of how experience management can be provided for containerized applications across migrations in accordance with one or more embodiments of the present invention. Turning to FIG. 2A, it is assumed that secure workspace 120-1 has been deployed on user computing device 100 to host application 121 (i.e., application 121 is a containerized application). It is also assumed that, in step 1, an administrator has used experience management solution 400 to apply one or more experience management policies or configurations for application 121 via experience management agent 132. For example, an administrator could have deployed an experience management policy or configuration to cause telemetry to be gathered regarding the performance of application 121 on user computing device 100, to customize the performance of application 121, or to cause debugging or other remediation functionality to be performed for application 121. The specific type or function of these experience management policies or configurations is not critical. Of importance is that experience management agent 132 applies the experience management policy or configuration to secure workspace 120-1 within which application 121 is hosted. In other words, the experience management policy or configuration is applied at the level of the secure workspace in which the application to be monitored/managed is hosted. It is also noted that experience management solution 400 is typically a separate system from workspace orchestrator 200 and management server 300 and may be used by different administrators.

Figure 2B:
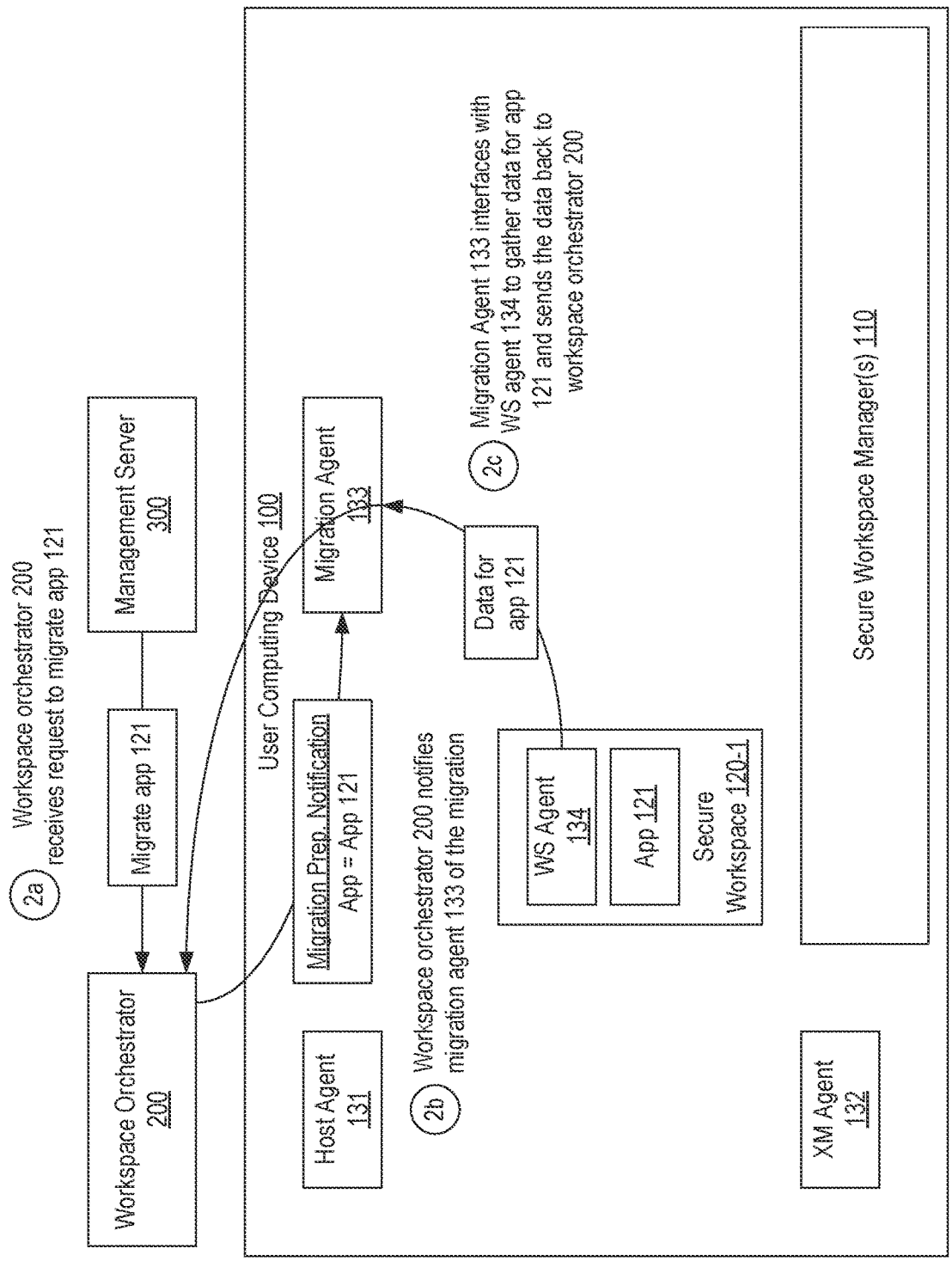

Turning to FIG. 2B, it is now assumed that, in step 2*a*, workspace orchestrator 200 receives a request to migrate application 121 to a new secure workspace. This request is shown as being received from management server 300 but could also be received from a user of user computing device 100 (e.g., via host agent 131) or in any other suitable manner. Although not represented in FIG. 2B, the experience management policies or configurations are currently applied to secure workspace 120-1 to provide experience management services to application 121 as it executes within secure workspace 120-1.

In response to the request to migrate application 121, in step 2b, workspace orchestrator 200 can send a migration preparation notification to migration agent 133 (possibly via host agent 131). This migration preparation notification can identify application 121 as the containerized application to be migrated. In step 2c, migration agent 133 can respond to the migration preparation notification by interfacing with workspace agent 134 within secure workspace 120-1 to obtain any data pertaining to application 121 that exists within secure workspace 120-1. For example, this data could include any user-specific data that application 121 has generated and stored. Migration agent 133 can provide this data for application 121 to workspace orchestrator 200 to thereby enable workspace orchestrator 200 to use the data as part of preparing the new secure workspace to which application 121 is to be migrated.

Figure 2C:
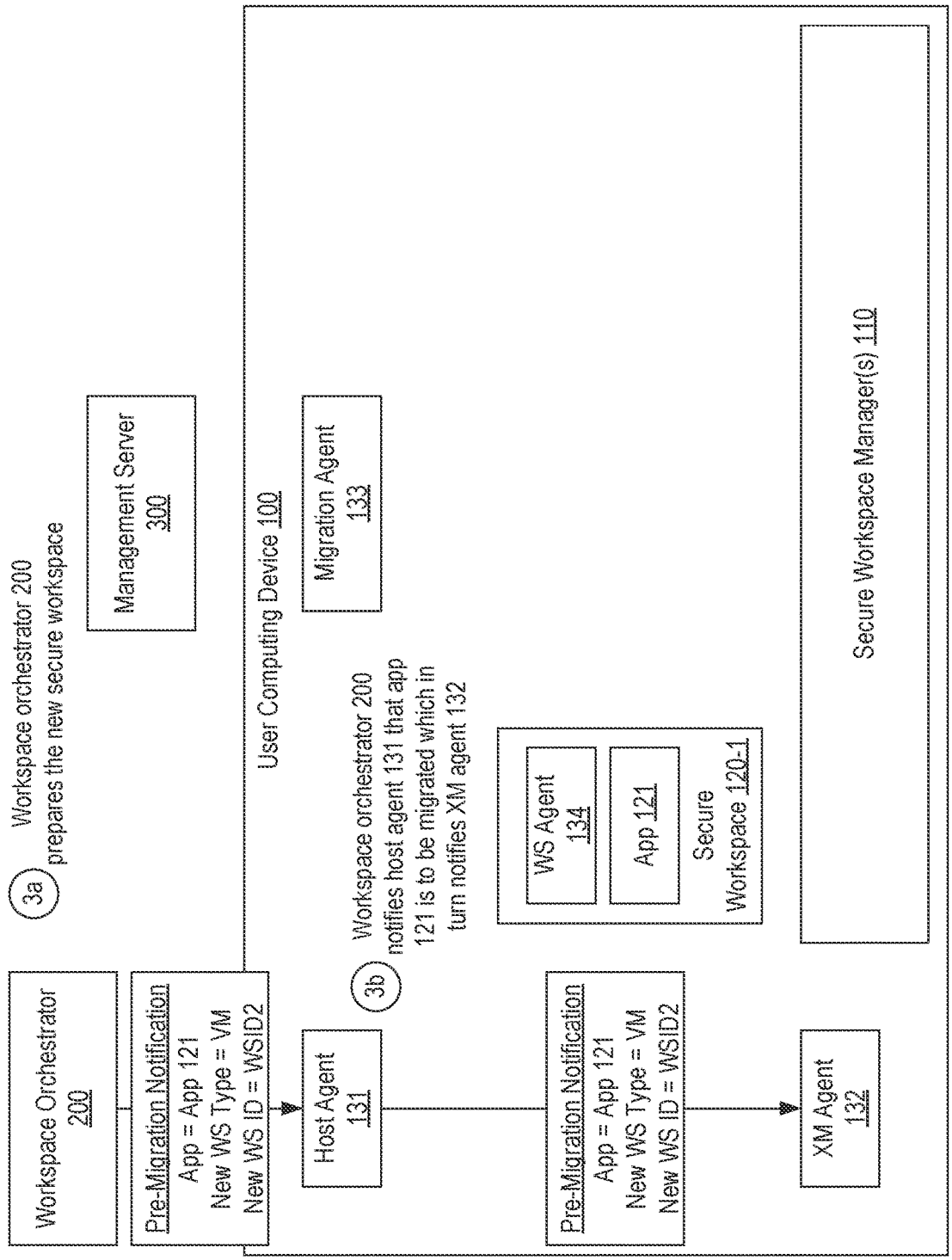

Turning to FIG. 2C, in step 3a, workspace orchestrator 200 can prepare a new secure workspace for application 121. For example, secure workspace 120-1 may be a Docker container and the migration may be performed to containerize application 121 in a more secure virtual machine. In such a case, workspace orchestrator 200 could create/prepare one or more images that can be attached to a virtual machine to create the new secure workspace containing application 121 and its data.

In step 3b, and in conjunction with preparing the new secure workspace, workspace orchestrator 200 can send a pre-migration notification to host agent 131. This pre-migration notification may identify the application to be migrated (application 121), the type of the new secure workspace (virtual machine), and an identifier of the new secure workspace (WSID2). Host agent 131 may relay this pre-migration notification to experience management agent 132. Accordingly, after step 3b, experience management agent 132 can know the type and identifier of the new secure workspace to which application 121 will be migrated. Experience management agent 132 may also store such information in association with any experience management policies or configurations that are currently being applied to application 121 in secure workspace 120-1.

Figure 2D:
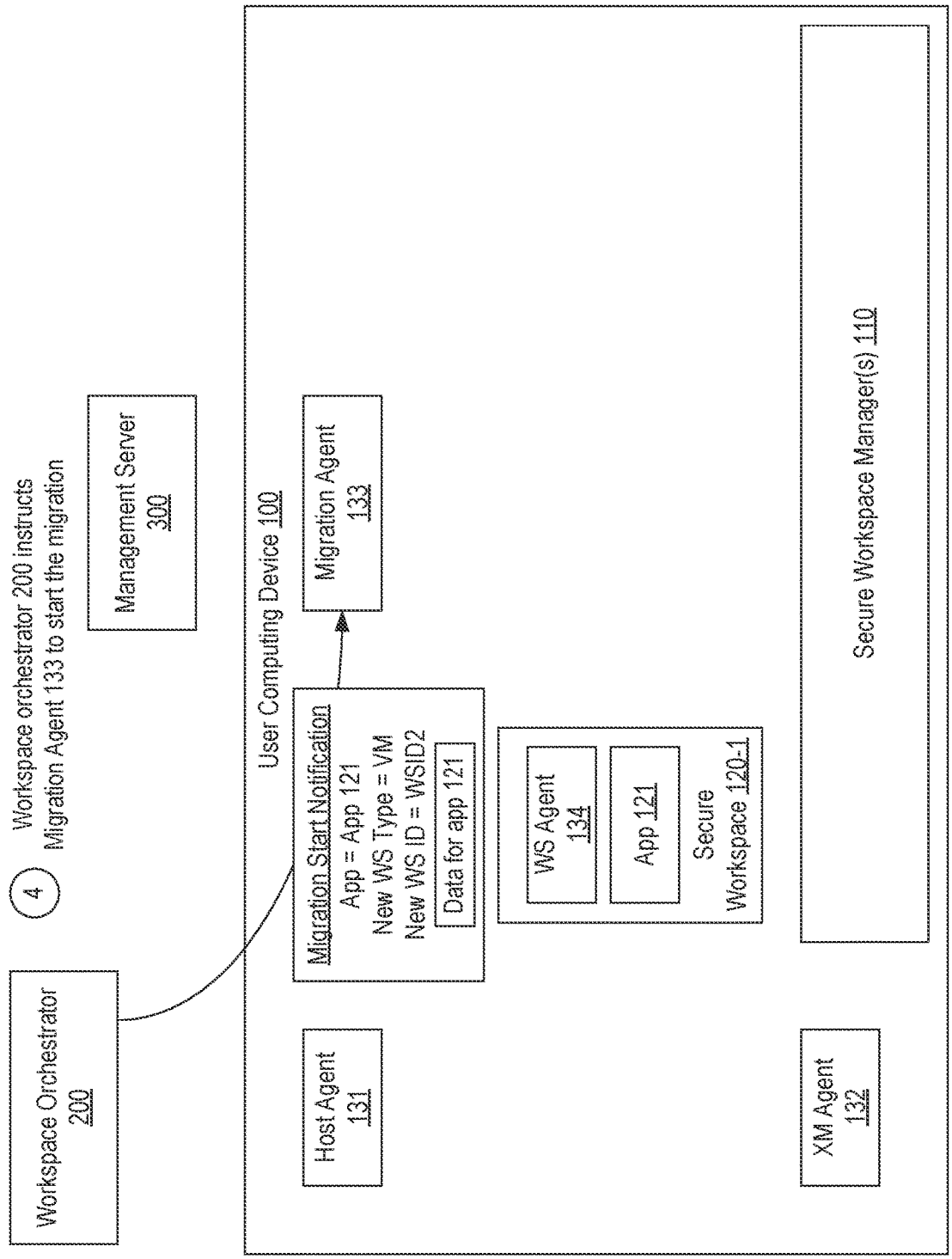

Turning to FIG. 2D, in step 4, workspace orchestrator 200 may send a migration start notification to migration agent 133. This migration start notification can instruct migration agent 133 to perform the migration of application 121. As shown, the migration start notification could identify the application to be migrated, the type and identifier of the new workspace to which the application is to be migrated, and any of the application's data that is to be maintained across the migration. In some embodiments, this migration start notification may include one or more images containing the application and its data, and possibly an operating system in the case of a virtual machine. In any case, upon receiving the migration start notification, migration agent 133 will have or will have access to the data it needs to migrate application 121 from secure workspace 120-1 to a new secure application.

Figure 2E:
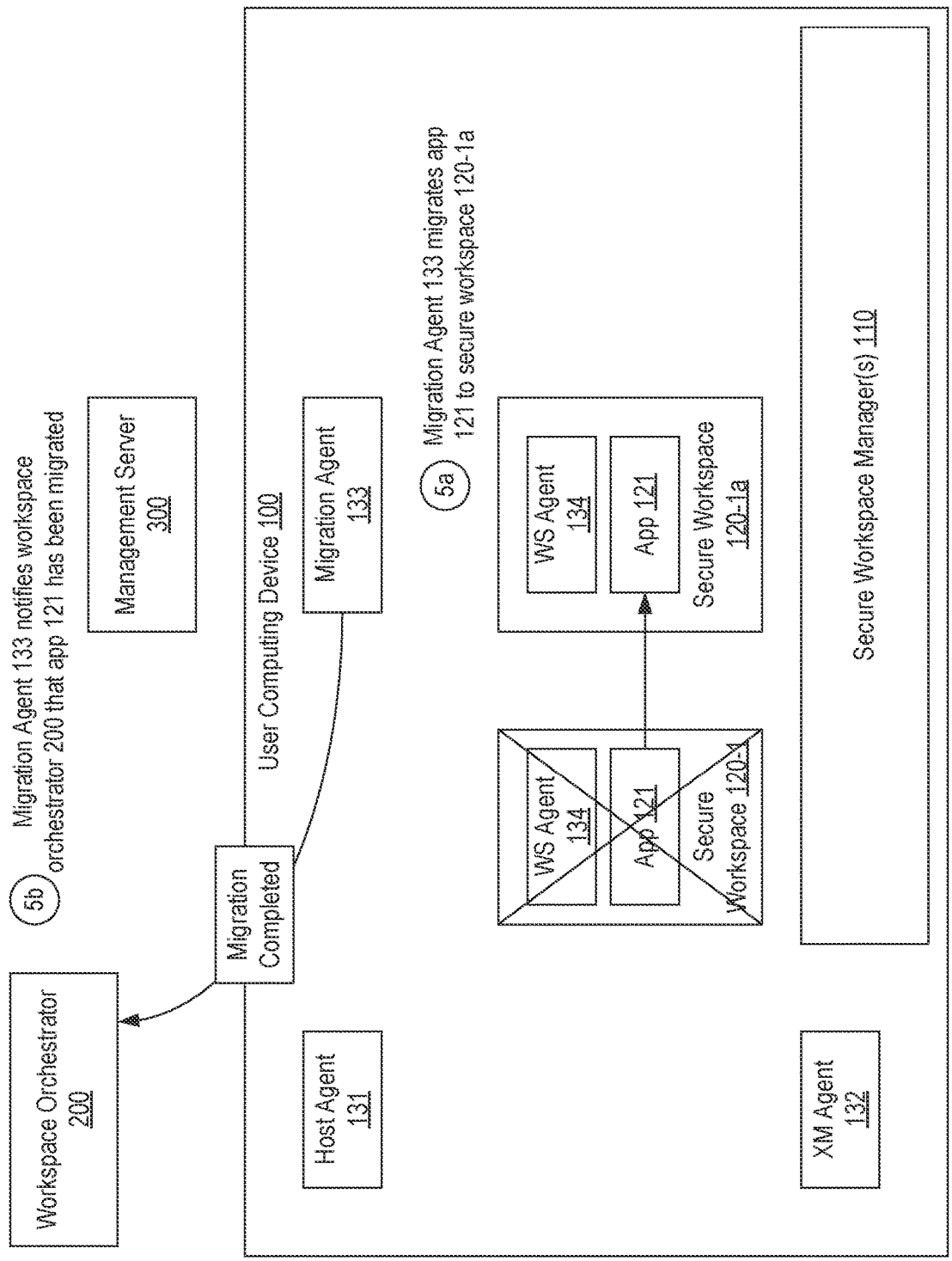

Turning to FIG. 2E, in step 5a, migration agent 133 can perform the migration of application 121 from secure workspace 120-1 to secure workspace 120-1a. Although not shown, migration agent 133 may provide workspace orchestrator 200 with confirmation that application 121 has been successfully migrated. Secure workspace 120-1a may typically be, but need not be, a different type of workspace from secure workspace 120-1. As part of this migration, migration agent 133 can apply the data it obtained in step 2c to ensure that the migration of application 121 appears seamless to the end user. FIG. 2E also represents that secure workspace 120-1 may be stopped/closed. Notably, the experience management policies or configurations that experience management agent 132 has applied to provide experience management services to application 121 will be attached to secure workspace 120-1 and will not have followed application 121 to secure workspace 120-1a. Accordingly, without the embodiments of the present invention, this migration would have blocked the experience management services from this point forward.

Figure 2F:
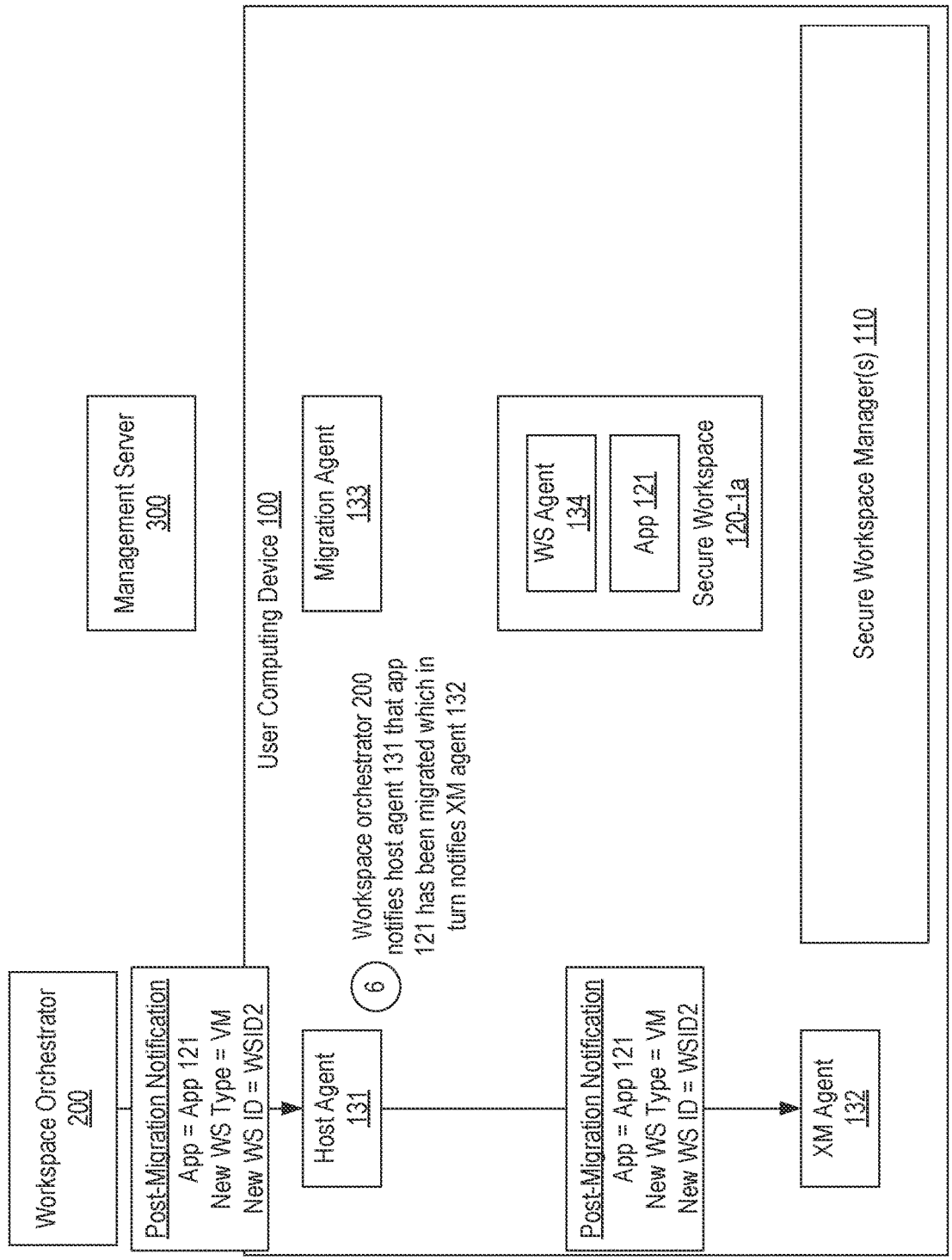

Turning to FIG. 2F, in step 6 which workspace orchestrator 200 may perform after being notified that application 121 was successfully migrated, workspace orchestrator 200 can send a post-migration notification to host agent 131 which in turn can relay the post-migration notification to experience management agent 132. This post-migration notification may identify the application that has been migrated and the type and identifier of the secure workspace to which the application was migrated. It is assumed that secure workspace 120-1a is a virtual machine and has an identifier of WSID2.

Figure 2G:
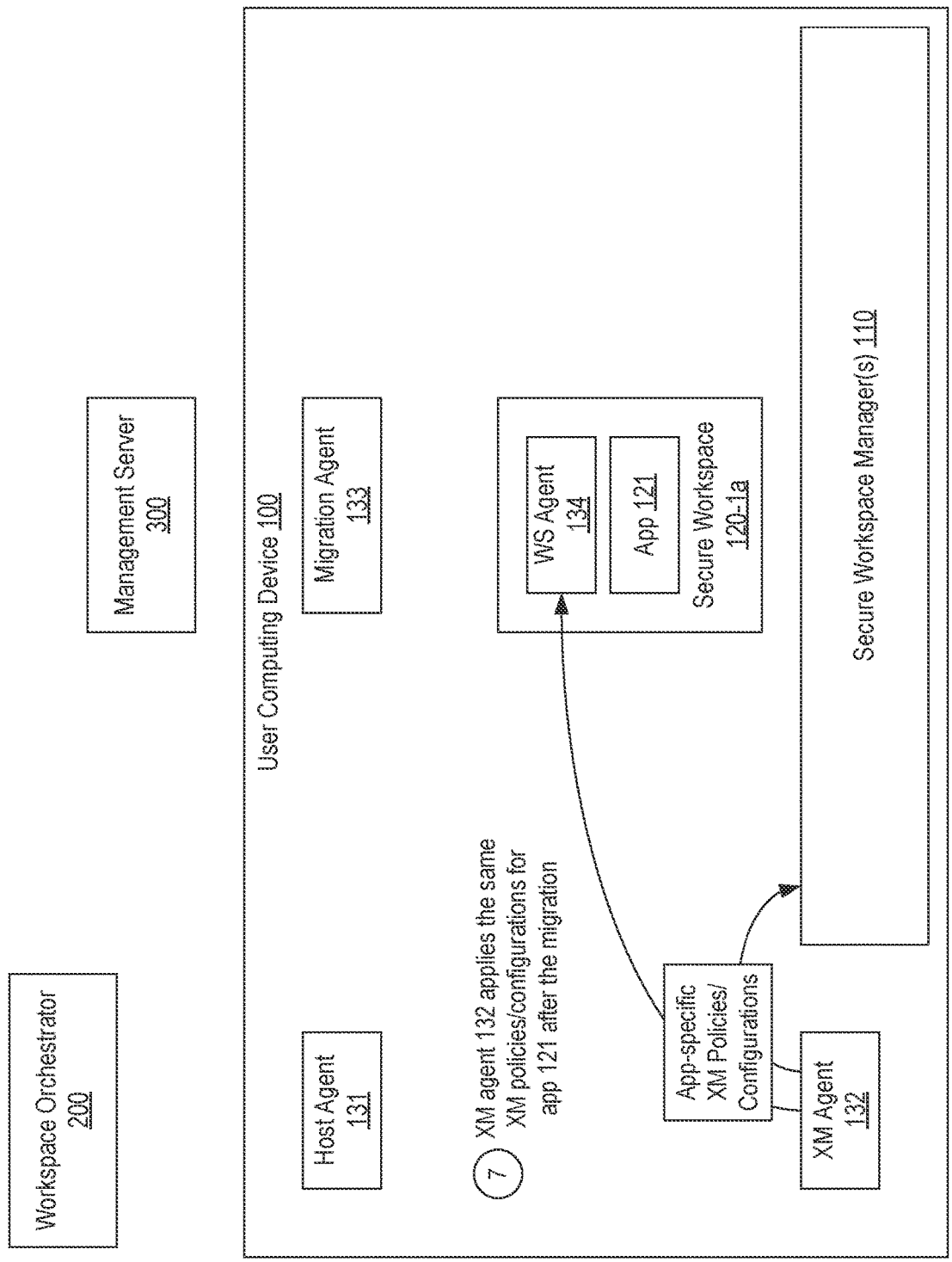

Turning to FIG. 2G, in response to the post-migration notification, experience management agent 132 can use the information contained in the post-migration notification to determine which experience management policies or configurations had been applied to application 121 (or more specifically, to secure workspace 120-1 in which application 121 had been hosted) prior to the migration and may apply the same experience management policies or configuration to secure workspace 120-1a in which application 121 is now hosted. In other words, experience management agent 132 can use the pre-migration notification and the post-migration notification to create an association between the old and new secure workspaces (e.g., between their respective IDs) and then leverage this association to apply the same experience management services to application 121 in the new secure workspace. For example, the same telemetry, remediation, or recommendation services that had been applied to secure workspace 120-1 can be automatically implemented in secure workspace 120-1a to ensure that the same experience management is provided for application 121 even though it was migrated.

Figure 3A:
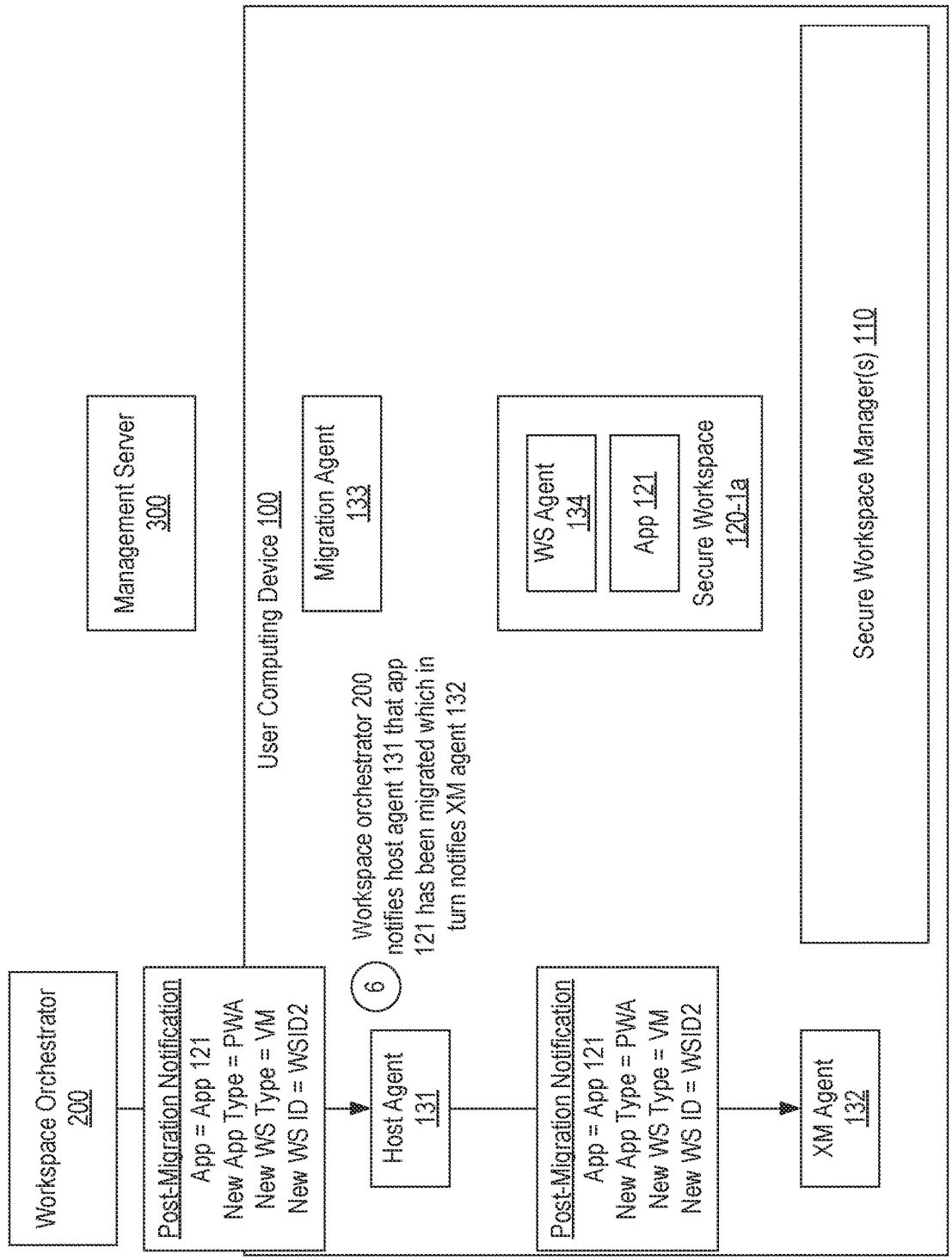
FIGS. 3A and 3B provide another example of how experience management can be provided for containerized applications across migrations in accordance with one or more embodiments of the present invention.
Figure 3B:
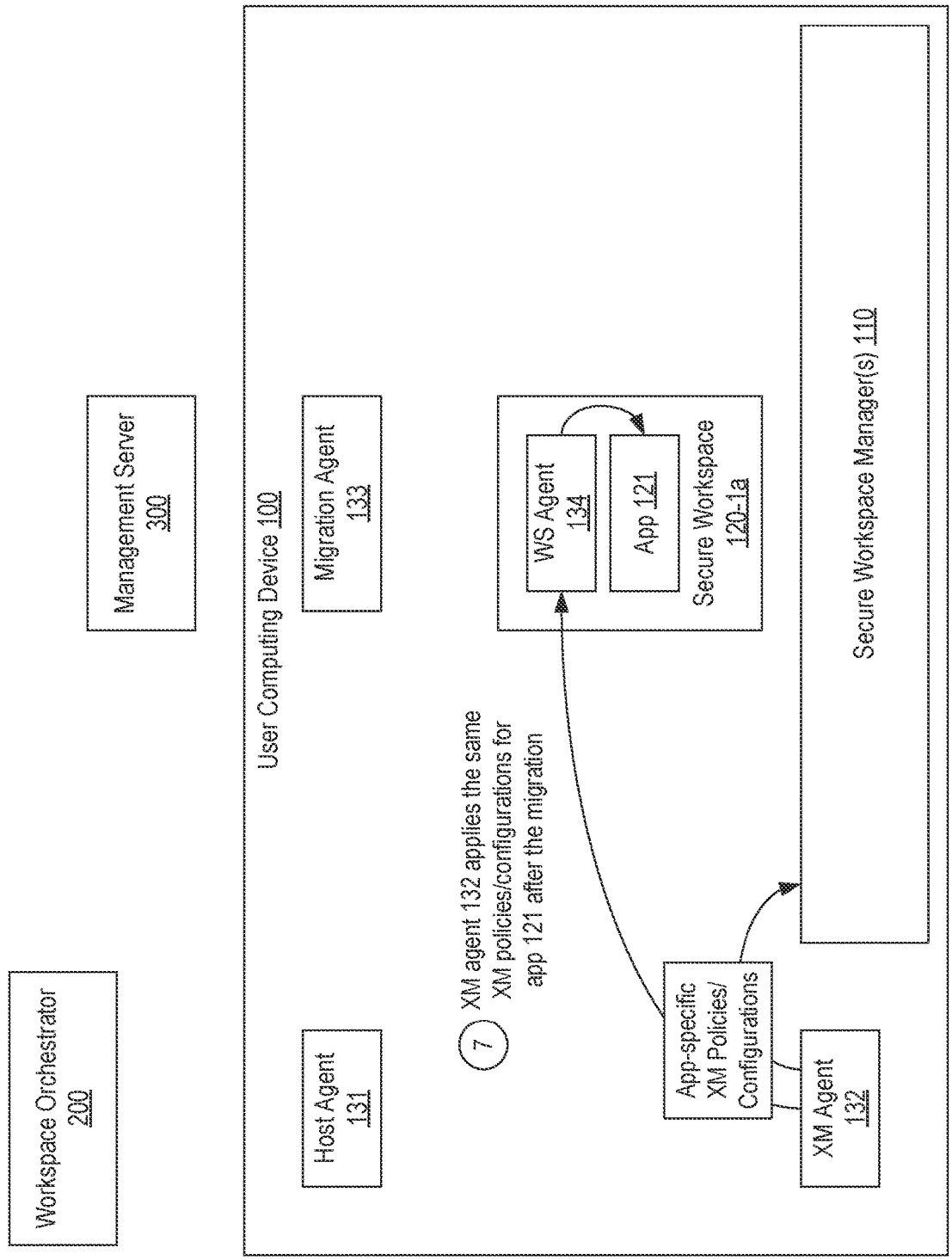

FIGS. 3A and 3B provide another example of how experience management can be provided for containerized applications across migrations in accordance with one or more embodiments of the present invention. In this example, it is assumed that the migration of application 121 also entails migrating the application type. For example, application 121 in secure workspace 120-1 may be Outlook.exe and application 121 in secure workspace 120-1a may be a progressive web app (PWA) version of Outlook.

FIG. 3A is based on FIG. 2F but shows that the post-migration notification sent in step 6 also identifies a new application type for application 121 after the migration. The pre-migration notification could also include this information. FIG. 3B is based on FIG. 2F but shows that, in step 7, experience management agent 132 may apply the same experience management policies and configurations by interfacing with workspace agent 134 to directly customize application 121 within secure workspace 120-1a.

FIGS. 3A and 3B can represent functionality that may be performed when the migration of application 121 only includes migrating the application type. For example, application 121 in the form of a .exe running in secure workspace 120-1 could be migrated to a progressive web application in secure workspace 120-1.

Figure 4A:
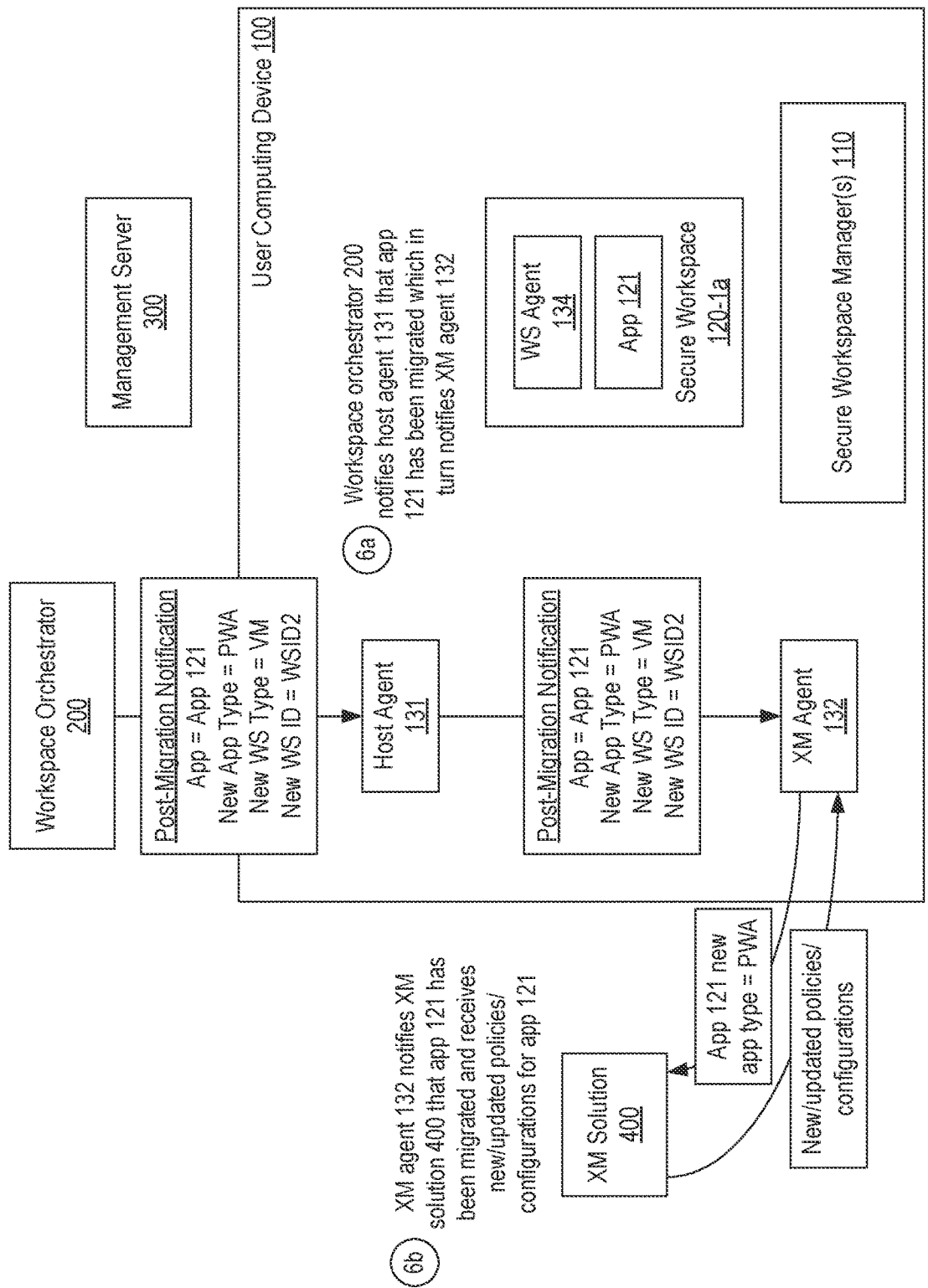
FIGS. 4A and 4B provide a further example of how experience management can be provided for containerized applications across migrations in accordance with one or more embodiments of the present invention.
Figure 4B:
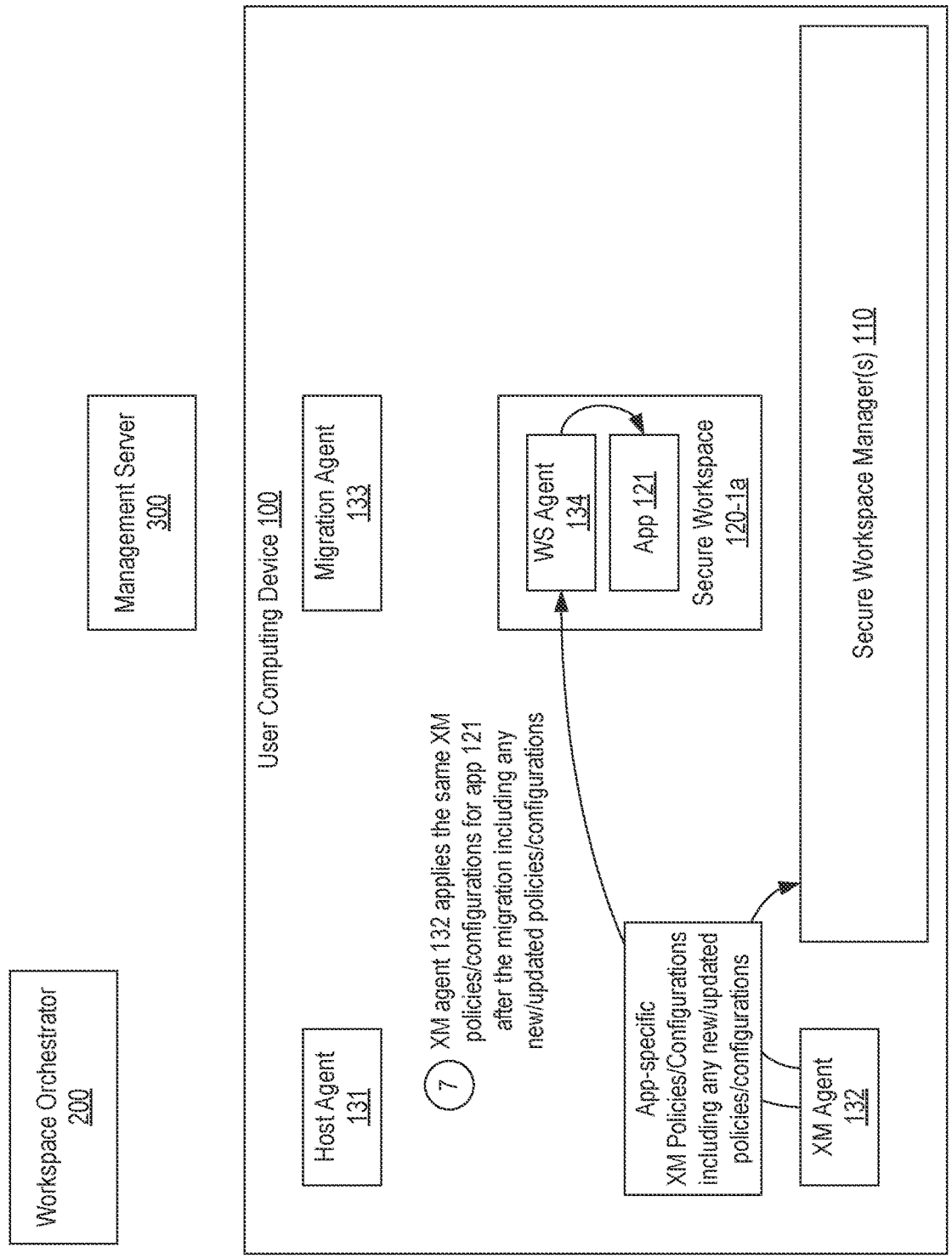

FIGS. 4A and 4B provide another example of how experience management can be provided for containerized applications across migrations in accordance with one or more embodiments of the present invention. In this example, it is again assumed that the migration of application 121 also entails migrating the application type.

Turning to FIG. 4A, step 6a, like step 6 in previous figures, encompasses the sending of the post-migration notification. As in FIG. 3A, the post-migration notification identifies a new application type for application 121. In step 6b, experience management agent 132 can notify experience management solution 400 that application 121 has been migrated to a new type of application which in this example is a progressive web app. In response, experience management solution 400 may provide new/updated experience management policies or configurations for application 121. Notably, in some embodiments, experience management agent 132 could request any new/updated experience management policies or configurations in response to receiving the pre-migration notification rather than or in addition to requesting them in response to receiving the post-migration notification.

Turning to FIG. 4B, in step 7, experience management agent 132 can apply the same experience management policies or configurations to secure workspace 120-1a including any new or updated experience management policies or configurations it received. For example, this step could entail applying an updated policy that enables webGL offload for application 121 so that application 121 performs better as a progressive web application or any other suitable customization for the new type of application 121.

In summary, embodiments of the present invention enable experience management solutions to continue working even when a containerized application is migrated. Such benefits are provided regardless of the types of secure workspaces involved in the migration and even if the migration involves a change in the application type. As a result, experience management services can be seamlessly migrated along with the application.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing experience management for containerized applications across migrations, the method comprising:
   executing an application on a user computing device by hosting the application in a first secure workspace that forms a first isolated environment on the user computing device;
   receiving, at an experience management agent that is executing on the user computing device outside of the first secure workspace, a first notification that the application hosted in the first secure workspace is to be migrated to a second secure workspace that forms a second isolated environment on the user computing device, the first notification including an identifier of the second secure workspace;
   creating an association between the identifier of the second secure workspace and one or more experience management policies or configurations that are currently applied to the first secure workspace;
   migrating the application to the second secure workspace to thereby cause the application to continue executing on the user computing device in the second secure workspace;
   receiving, at the experience management agent, a second notification that the application has been migrated to the second secure workspace; and
   based on the association between the identifier of the second secure workspace and the one or more experience management policies or configurations, applying the one or more experience management policies or configurations to the second secure workspace.

2. The method of claim 1, wherein the first notification is generated by a workspace orchestrator in response to preparing the second secure workspace.

3. The method of claim 1, wherein the second notification is generated by a workspace orchestrator in response to being notified that the application has been migrated to the second secure workspace.

4. The method of claim 1, further comprising:
causing a migration agent to obtain data from the first secure workspace; and
migrating the data with the application to the second secure workspace.

5. The method of claim 1, wherein one or both of the first and second notifications identifies a type of the second secure workspace.

6. The method of claim 1, wherein applying the one or more experience management policies or configurations to the second secure workspace comprises interfacing with a secure workspace manager for the second secure workspace.

7. The method of claim 1, wherein applying the one or more experience management policies or configurations to the second secure workspace comprises providing one or more of telemetry, remediation, or recommendation services for the application within the second secure workspace.

8. The method of claim 1, wherein one or both of the first and second notifications identify an application type of the application in the second secure workspace which is different from an application type of the application in the first secure workspace.

9. The method of claim 8, wherein applying the one or more experience management policies or configurations to the second secure workspace includes applying one or more updated or new experience management policies or configurations that are selected based on the application type of the application in the second secure workspace.

10. The method of claim 9, wherein the one or more updated or new experience management policies or configurations are obtained from an experience management solution.

11. The method of claim 9, wherein applying the one or more updated or new experience management policies or configurations comprises configuring the application in the second secure workspace.

12. One or more computer storage media storing computer executable instructions which when executed implement a method for providing experience management for containerized applications across migrations, the method comprising:
executing an application on a user computing device by hosting the application in a first secure workspace that forms a first isolated environment on the user computing device;
receiving a request to migrate the application from the first secure workspace to a second secure workspace that forms a second isolated environment on the user computing device;
preparing the second secure workspace;
in conjunction with preparing the second secure workspace, sending a first notification to an experience management agent executing on the user computing device outside the first secure workspace, the first notification including an identifier of the second secure workspace;
creating an association between the identifier of the second secure workspace and one or more experience management policies or configurations that are currently applied to the first secure workspace;
migrating the application to the second secure workspace to thereby cause the application to continue executing on the user computing device in the second secure workspace;
sending a second notification to the experience management agent indicating that the application has been migrated to the second secure workspace; and
in response to the second notification, applying the one or more experience management policies or configurations to the second secure workspace.

13. The computer storage media of claim 12, wherein the second notification includes the identifier of the second secure workspace.

14. The computer storage media of claim 12, wherein the method further comprises:
causing a migration agent to obtain data from the first secure workspace; and
migrating the data with the application to the second secure workspace.

15. The computer storage media of claim 12, wherein one or both of the first and second notifications identifies a type of the second secure workspace.

16. The computer storage media of claim 12, wherein one or both of the first and second notifications identify an application type of the application in the second secure workspace which is different from an application type of the application in the first secure workspace.

17. The computer storage media of claim 16, wherein applying the one or more experience management policies or configurations to the second secure workspace includes applying one or more updated or new experience management policies or configurations that are selected based on the application type of the application in the second secure workspace.

18. The computer storage media of claim 17, wherein the one or more updated or new experience management policies or configurations are obtained from an experience management solution.

19. A system comprising:
one or more servers comprising one or more hardware processors on which a workspace orchestrator is executed;
an experience management solution; and
one or more user computing devices, each user computing device including one or more hardware processors which execute a host agent, a migration agent, and an experience management agent, and wherein the system is configured to implement a method for providing experience management for containerized applications across migrations, the method comprising:
executing an application on a first user computing device of the one or more user computing devices by hosting the application in a first secure workspace that forms a first isolated environment on the first user computing device;
receiving, at the experience management agent that is executing on the first user computing device outside of the first secure workspace, a first notification that the application hosted in the first secure workspace is to be migrated to a second secure workspace that forms a second isolated environment on the user computing device, the first notification including an identifier of the second secure workspace;
creating an association between the identifier of the second secure workspace and one or more experience management policies or configurations that are currently applied to the first secure workspace;

migrating the application to the second secure workspace to thereby cause the application to continue executing on the first user computing device in the second secure workspace;

receiving, at the experience management agent, a second notification that the application has been migrated to the second secure workspace; and based on the association between the identifier of the second secure workspace and the one or more experience management policies or configurations, applying the one or more experience management policies or configurations to the second secure workspace.

20. The system of claim 19, wherein one or both of the first and second notifications identify an application type of the application in the second secure workspace which is different from an application type of the application in the first secure workspace.

* * * * *